United States Patent [19]
Wulf et al.

[11] Patent Number: 4,936,225
[45] Date of Patent: Jun. 26, 1990

[54] TRACK-GUIDABLE OMNIBUS

[75] Inventors: Helmut Wulf, Ostfildern; Siegbert Sawatzky, Wernau, both of Fed. Rep. of Germany

[73] Assignee: Daimler-Benz AG, Fed. Rep. of Germany

[21] Appl. No.: 307,964

[22] Filed: Feb. 9, 1989

[30] Foreign Application Priority Data

Feb. 13, 1988 [DE] Fed. Rep. of Germany ....... 3804585

[51] Int. Cl.$^5$ ........................... B61K 5/00; B62D 1/26
[52] U.S. Cl. ..................................... 104/247; 180/131
[58] Field of Search ............... 104/119, 243, 245–247, 104/244.1; 180/131; 301/128

[56] References Cited

U.S. PATENT DOCUMENTS

| | | | |
|---|---|---|---|
| 2,718,194 | 9/1955 | Ruhlmann | 104/247 |
| 4,213,396 | 7/1980 | Mehren et al. | 104/247 X |
| 4,301,739 | 11/1981 | Mehren et al. | 180/131 |
| 4,777,887 | 10/1988 | Thudt | 104/247 |

FOREIGN PATENT DOCUMENTS

| | | |
|---|---|---|
| 79867 | 8/1985 | Australia . |
| 0686979 | 9/1966 | Belgium . |
| 0007788 | 7/1979 | European Pat. Off. . |
| 3103488 | 8/1982 | Fed. Rep. of Germany . |
| 3704517 | 4/1988 | Fed. Rep. of Germany ...... 104/247 |
| 1058847 | 2/1967 | United Kingdom . |
| 1336737 | 11/1973 | United Kingdom . |
| 1566066 | 4/1980 | United Kingdom . |

Primary Examiner—Robert J. Oberleitner
Attorney, Agent, or Firm—Evenson, Wands, Edwards, Lenahan & McKeown

[57] ABSTRACT

The invention relates to a track-guidable omnibus, each of the lockable vehicle wheels of which is preceded by an associated transverse guide roller arranged near the ground, which is mounted in a rigid position relative to the wheel plane of the vehicle wheel by a bracket arm. An easily exchangeable change part, which contains a preferred breaking point, is interposed between the transverse guide roller and the end of the bracket arm in the end region of the bracket arm. This is intended to prevent secondary damage to the steering in the case of ground collisions. In order to prevent "derailment" from the track in case of a roller breakage during track-guided service of the vehicle, an emergency contact surface, which temporarily and provisionally assumes the function of the transverse guide roller when the latter is broken off, is provided protected between the transverse guide roller and the vehicle wheel. The emergency contact surface may be formed by a small skid or by a small emergency roller.

11 Claims, 5 Drawing Sheets

TRACK-GUIDABLE OMNIBUS

BACKGROUND AND SUMMARY OF THE INVENTION

The invention relates to a track guidable omnibus of the type such as is known from German Patent No. (DE-PS) 3,013,488 for example. Such omnibus contains a transverse guide roller mounted on a bracket with a preferred breaking point for preventing secondary damage to the vehicle steering in case of collisions.

The preferred breaking point in the bracket of the transverse guide roller is intended to Protect the linkage of the steerable vehicle axle from consequent damage in the case of an accidental collision of the transverse guide roller with road obstacles. Collisions of this type normally occur outside the track-guiding road, that is to say during manually steered service, particularly during shunting or during avoidance maneuvers. A crack or a total breakage of the preferred breaking point is signalled to the driver visually and/or acoustically in his field of perception. The driver has to stop and send for a workshop vehicle, which exchanges the broken transverse guide roller for a transverse guide roller in perfect condition, which is done relatively quickly.

It is impossible to exclude the possibility that a breakage of the preferred breaking point might also occur in track-guided service, that is to say, within the track-guiding road. Because as a result of the automatic track-guidance of the vehicle, the driver no longer has his hands on the steering wheel of the omnibus, and can also simplY direct his attention to other things than steering the vehicle, there is a danger of the vehicle temporarily travelling unguided in the case of a breakage of the preferred breaking point. Violent stressing of the preferred breaking point of the transverse guide roller may occur firstly during the introduction of the vehicle at the start of the track-guided route, or by a lateral road obstacle present within the road, which the transverse guide roller rolls over. Since the transverse guide roller is mounted rigidly in the lateral direction, such an obstacle on the transverse guide rail must almost inevitably lead to a breakage of the transverse guide roller.

An object of the invention is to ensure that, in spite of a breakage of the transverse guide roller during track guided service and when the vehicle driver's attention is elsewhere, the vehicle is nevertheless maintained within the track-guiding transverse guide rails which could Per se be over-rolled by the vehicle wheels.

This object is achieved according to the invention by providing an arrangement wherein an emergency contact surface located approximately at the same height as the transverse guide roller and exposed freely towards the outside of the wheel is fitted to the bracket arm supported at a point located nearer the vehicle wheel — considered from the preferred breaking point, which surface is, however, set back in the lateral direction relative to the external circumferential part of the transverse guide roller, but which overhangs (dimension a) the external side flank of the wheel tire laterally. By virtue of the emergency contact surface fitted to the bracket arm set back in the lateral direction and relatively low down, in spite of a broken transverse guide roller it is possible for the bracket arm to be maintained on the track at least sufficiently for the tire of the vehicle wheel not to touch the transverse guide rail with its leading circumferential part, so that the danger of the vehicle wheel "climbing up" onto the transverse guide rail is eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
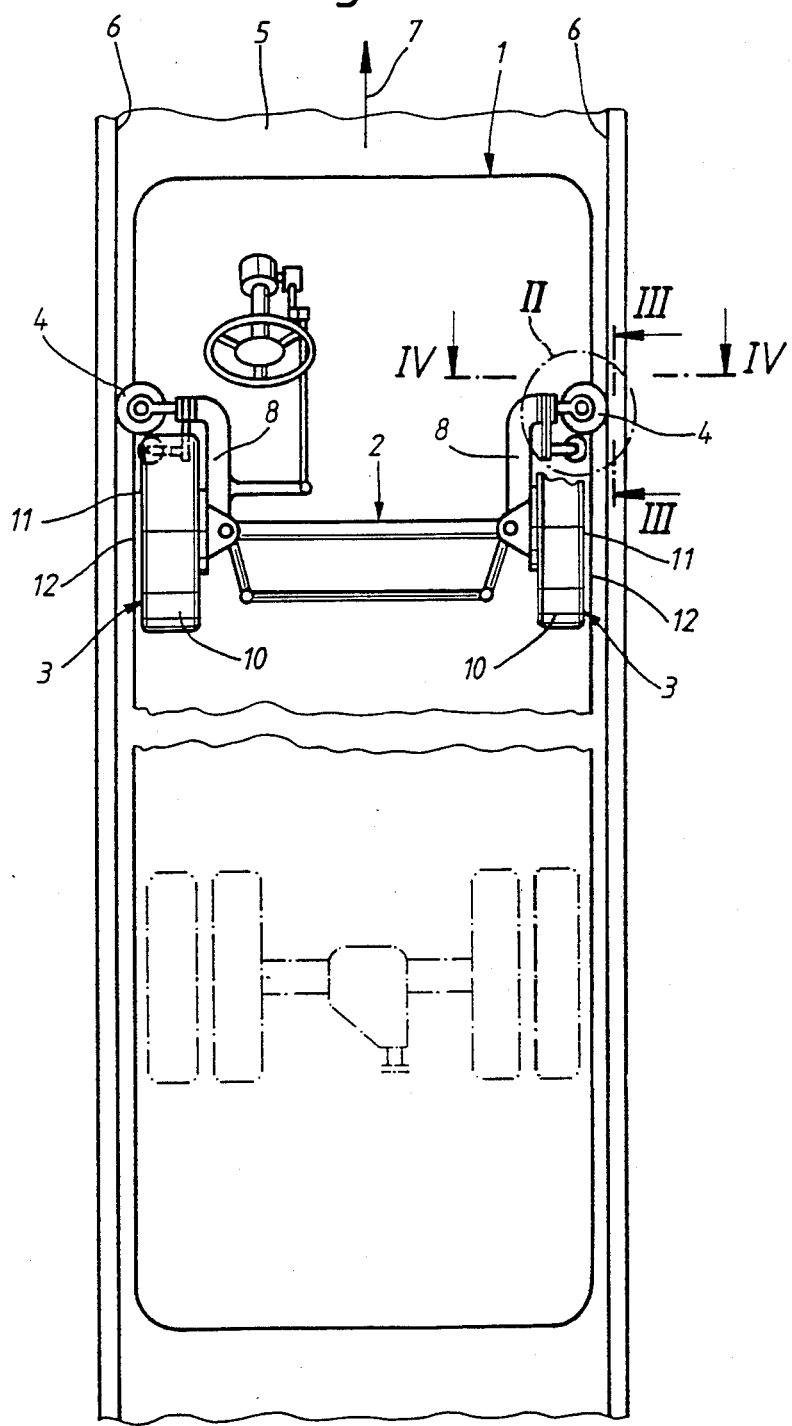
FIG. 1 shows a plan view of a track guidable omnibus within a track-guiding road, constructed according to a preferred embodiment of the invention.
Figure 2:
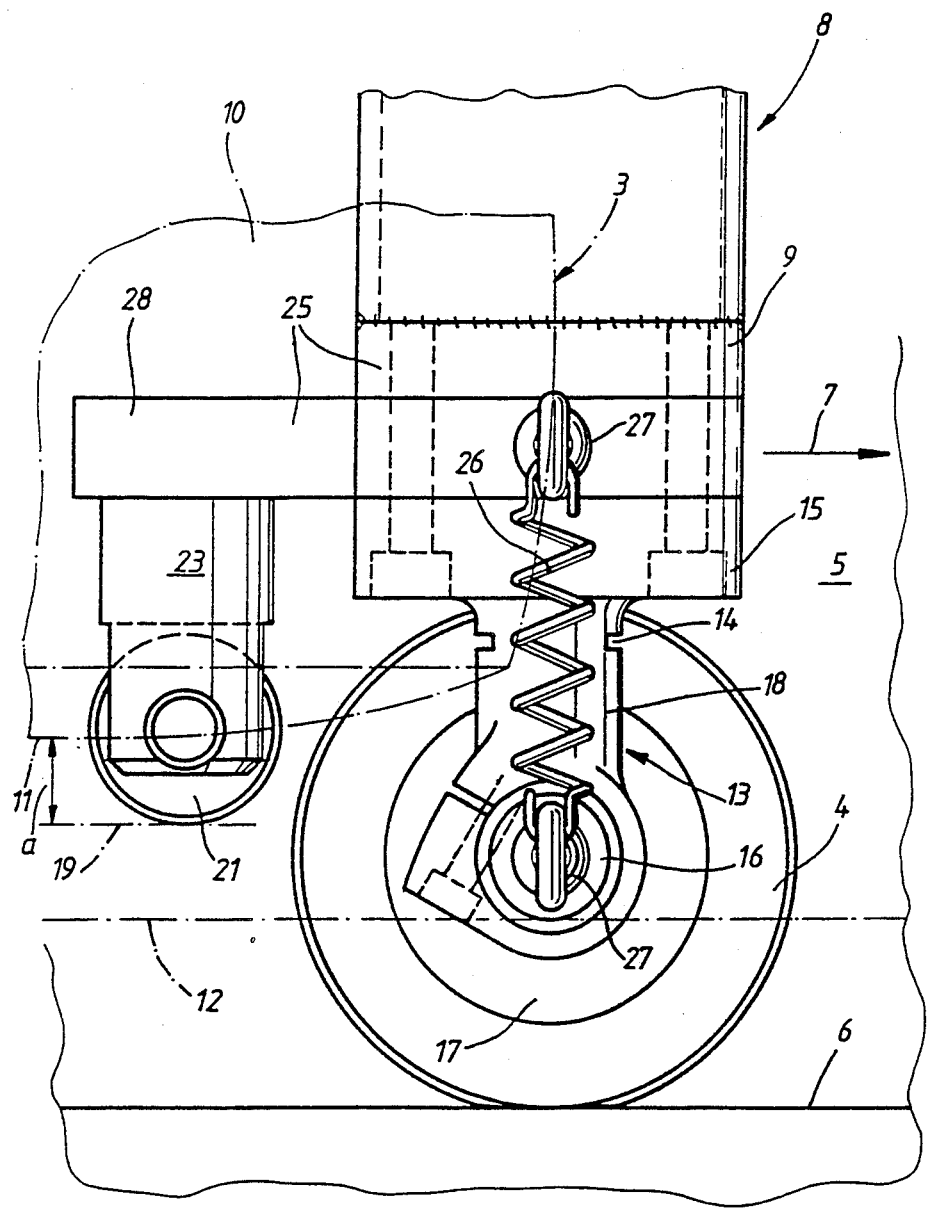
FIGS. 2 to 4 show detailed views on a larger scale of the bracket of the front right-hand transverse guide roller including the emergency contact surface of FIG. 1, from above (FIG. 2), from the side (FIG. 3) and from in front (FIG. 4)
Figure 3:
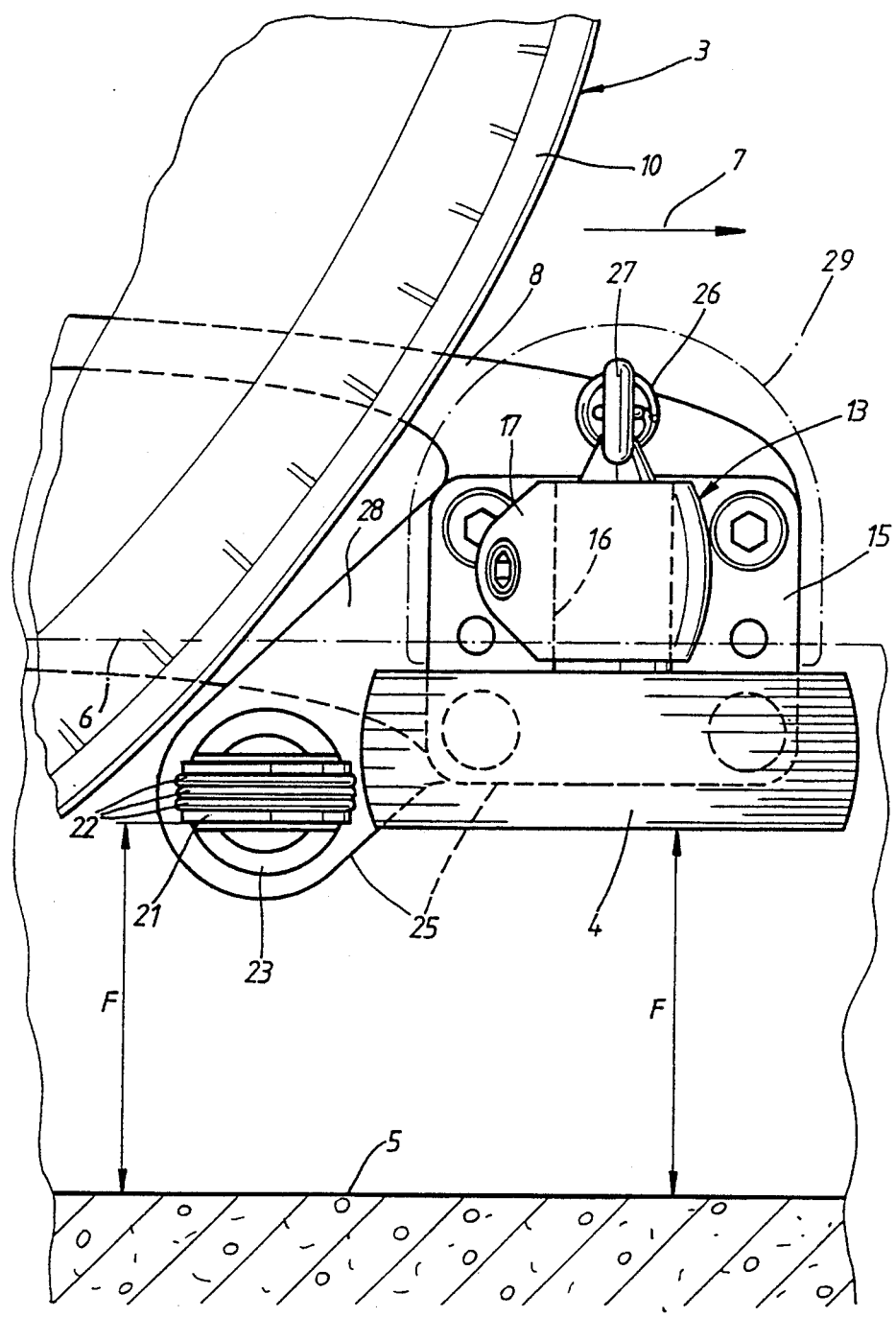
Figure 4:
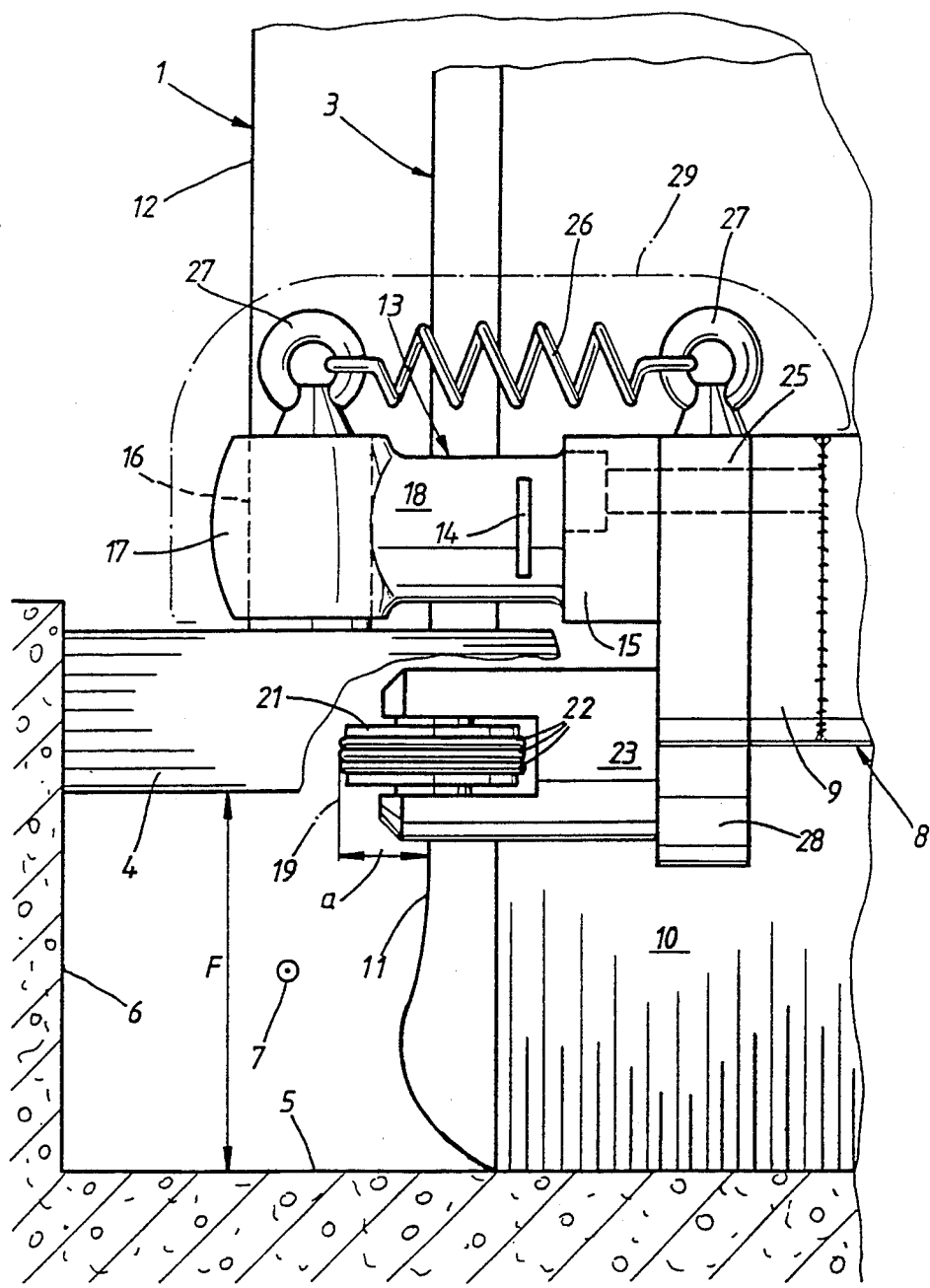

The plan view in FIG. 1 shows a track-guideable omnibus 1 within a track-guiding road 5, which exhibits track-determining transverse guide rails 6 on both sides. The omnibus can alternatively either be freely steered manually on normal roads or — as stated — be track-guided automatically on special lanes. For this purpose a horizontally placed transverse guide roller 4 is associated near the ground on the omnibus with each lockable vehicle wheel 3 of the steerable vehicle axle 2. To mount the transverse guide rollers 4, each vehicle wheel 3 exhibits a bracket arm 8 which is fastened to the pivotable part of the steerable vehicle axle 2 and participates in the lock movements of the vehicle wheel 3. This bracket arm 8 embraces the vehicle wheel 3 from the inside forwards (travel direction arrow 7) and is cranked towards the outside of the vehicle at its front part. It carries there a fastening flange 9 placed approximately parallel to the outside of the vehicle, to which a change part 13, to be dealt with in greater detail later, is connected by flanges and in turn supports the transverse guide roller 4 through a journal 16.

The change part 13 comprises a substantially cylindrical neck 18, which merges at the outer end into a clamp sleeve 17 into which the journal 16 for the transverse guide roller 4 is clamped firmly but exchangeablY. On the side facing the bracket arm 8, a flange 15 which corresponds to the fastening flange 9 on the bracket arm 8, is shaped on the neck 18. A definite preferred breaking point 14 is made in the bracket of the transverse guide roller 4 by vertical incisions in the neck 18 of the change part 13. When the preferred breaking point breaks or cracks, the change part 13 with a transverse guide roller previously assembled on it, can easily be exchanged. Although the transverse guide roller 4 is arranged near the ground, nevertheless it has a certain inside vertical interval — clearance F — relative to the road surface 5, which is dimensioned sufficiently high so that the transverse guide rollers 4 are normally in no danger of coming into collision with customary road curbstones in manually steered service. The clearance F and the required width of the transverse guide roller 4 substantially determine the vertical height of the lateral transverse guide rails 6; the latter are in fact slightly higher than the sum of the two dimensions just given.

Since the bracket arm 8 and the transverse guide roller 4 are among the unsprung parts of the vehicle axle 2, they execute no springing movements — apart from a certain tire flattening - so that the protrusion of the transverse guide rail above the toP edge of the transverse guide roller 4 can be relatively small It is then still safe to roll even over road obstacles of the order of magnitude of the transverse guide roller 4, without danger of the transverse guide roller 4 losing contact with the transverse guide rail 6. However, larger road obstacles are immediately noticed in due time by the vehicle driver, so that if necessary he can stop and clear the road obstacle.

In view of maintaining the clearance F beneath the transverse guide roller 4, and in view of as low as possible a transverse guide rail 6, the transverse guide roller 4 is embraced from above by the bracket arm 8 and particularly by the change part 13. If the change part 13 should break off at the preferred breaking Point 14 and the transverse guide roller 4 should move away upwards, it would immediately be possible for the broken surface of the change part 13, located staggered backward and inwards relative to the external side flank 11 of the wheel tire 3, to pivot beyond the top edge of the transverse guide rail 6. Thus in the case of a broken roller there would be a danger of the wheel tire 3 rubbing and "climbing up" on the corresponding transverse guide rail 6 with the leading circumferential part on the inside, so that the danger of a "derailment" of the omnibus out of the track-guiding road would exist. In order to prevent this, however, according to the invention an emergency contact surface 19 is provided which is fitted to the bracket arm 8, although it is set back laterally relative to the external circumferential part of the transverse guide roller 4, and overhangs laterally — dimension a — the external side flank 11 of the wheel tire 10.

In the exemplary embodiment illustrated in FIGS. 1 to 4 the emergency contact surface 19 is formed by an emergency roller 21. It is mounted at a point of the bracket arm 8 which is located closer to the vehicle wheel 3 — considered from the preferred breaking point 14. The emergency contact surface is furthermore freely exposed towards the outside of the wheel and is placed approximately at equal height to the lower part of the transverse guide roller 4. It is fitted with space economy and protection in the gap between the transverse guide roller 4 and the vehicle wheel 3, that is to say behind the transverse guide roller 4 in the travel direction 7. Although the emergency contact surface 19 — in contrast to the transverse guide roller 4 — does not project relative to the lateral outside contour 12 of the vehicle, but is set back relative to this lateral boundary line, nevertheless the emergency contact surface 19 — as stated — overhangs the side flank 11 of the wheel tire 10. The emergency contact surface is protected from accidental collisions by being thus arranged exposed in the lateral direction relative to the preferred breaking point 14, but set back in a lateral direction relative to the transverse guide roller 4. Also, in the case of a breakage of the transverse guide roller within the track-guiding road, it can temporarily and provisionally perform a track guidance — although with play — of the vehicle and reliably prevent "derailment" out of the track. The reason for this is that the emergency contact surface projects relative to the external side flank 11 of the wheel tire 10 and prevents the leading circumferential part of the wheel tire scuffing against the transverse guide rail 6. As stated, a provisional track guidance of the omnibus by the emergency contact surface 19 is only required temporarily, namely until, after the transverse guide roller 4 has broken off, the driver has either brought the vehicle to a standstill or himself taken the manual steering wheel. He can in fact, by manual steering and tensioning the steering to one side towards the opposite — that is, still intact — transverse guide roller, steer the vehicle safely, that is on the correct track, through the track-guiding road, even at high speeds of travel by means of one-sided track guidance. He can then drive to the nearest exit point, send for a repair vehicle there and wait for repairs.

To prevent the broken transverse guide roller from flying off without control, an energy-absorbing interceptor, which is fitted in the interior of the neck 18, absorbs the kinetic energy of the transverse guide roller when it is thrown off for a short flight distance and retains the transverse guide roller near the breakage point of the travelling vehicle. So that the transverse guide roller, if it has broken off, is also lifted upwards out of the track, a pretensioned erector spring 26, which is fitted above the preferred breaking point 14 and is fastened on either side of it. In the exemplary embodiment illustrated the erector spring 26 is constructed as a helicoidal traction spring which is hooked by the hooking eyes attached to its ends into an eyebolt 27 in each case. The one of the eyebolts is screwed into the end face of the journal 16; the other eyebolt 27 is screwed into the circumferential side of a further intermediate plate 25 which will be explained in more detail below. Although the erector spring 26 assists the effect of the energy-absorbing interceptor, nevertheless it would be unable to perform this function alone.

In the exemplary embodiment illustrated in FIGS. 1 to 4 the emergency contact surface 19 is formed — as stated — by an emergency roller 21, which may be constructed as a round metal disc in the simplest case. Aluminum, bronze or stainless steel are recommended as materials for this application with a view to good sliding properties and resistance to corrosion. To prevent the emergency contact surface from jumping on the side surface of the transverse guide rail 6, which exhibits joints and certain irregularities, the emergency roller 21 is advantageously provided with a vibration-damping tire, which is formed in the exemplary embodiment illustrated by three rubber round cord rings 22 placed directlY juxtaposed and bonded into a corresponding housing groove. Other possible materials for a vibration-damping tire on the emergency roller 21 would be plastic or a wood bandage comprising wound and bonded chips.

To maintain the emergency roller 21 in the correct vertical and lateral position in the region of the residue of the bracket arm 8 which does not break off, in the exemplary embodiment illustrated an intermediate plate 25 is provided which is interflanged in common with the flange 15 of the change part 13 on the fastening flange 9 of the bracket arm 8. The intermediate plate 25 comprises a shank 28 which remains within the plane of the plate and extends obliquely downwards and to which a bolt 23 is fastened to protrude transversely from the intermediate plate. This bolt 23 has a bifurcate construction due to a horizontal slot made in the region of its free end, and houses the emergency roller 21 rotatably in the latter.

In order to protect the roller bracket, which is located in the spray range of the vehicle wheel 3, from excessive contamination, and also to enable dirt which is thrown up to be sprayed off more easily, the roller bracket is covered with a rubber cap 29 of adapted shape, which partly embraces the roller bracket resiliently and can be clipped on. Dirt runs off it more easily; it can also be sprayed off easily, so that the roller bracket does not appear to be an ugly dirt trap. The bearing parts and breakage sensors, some of which are sensitive, are also Protected by it.

Figure 5:
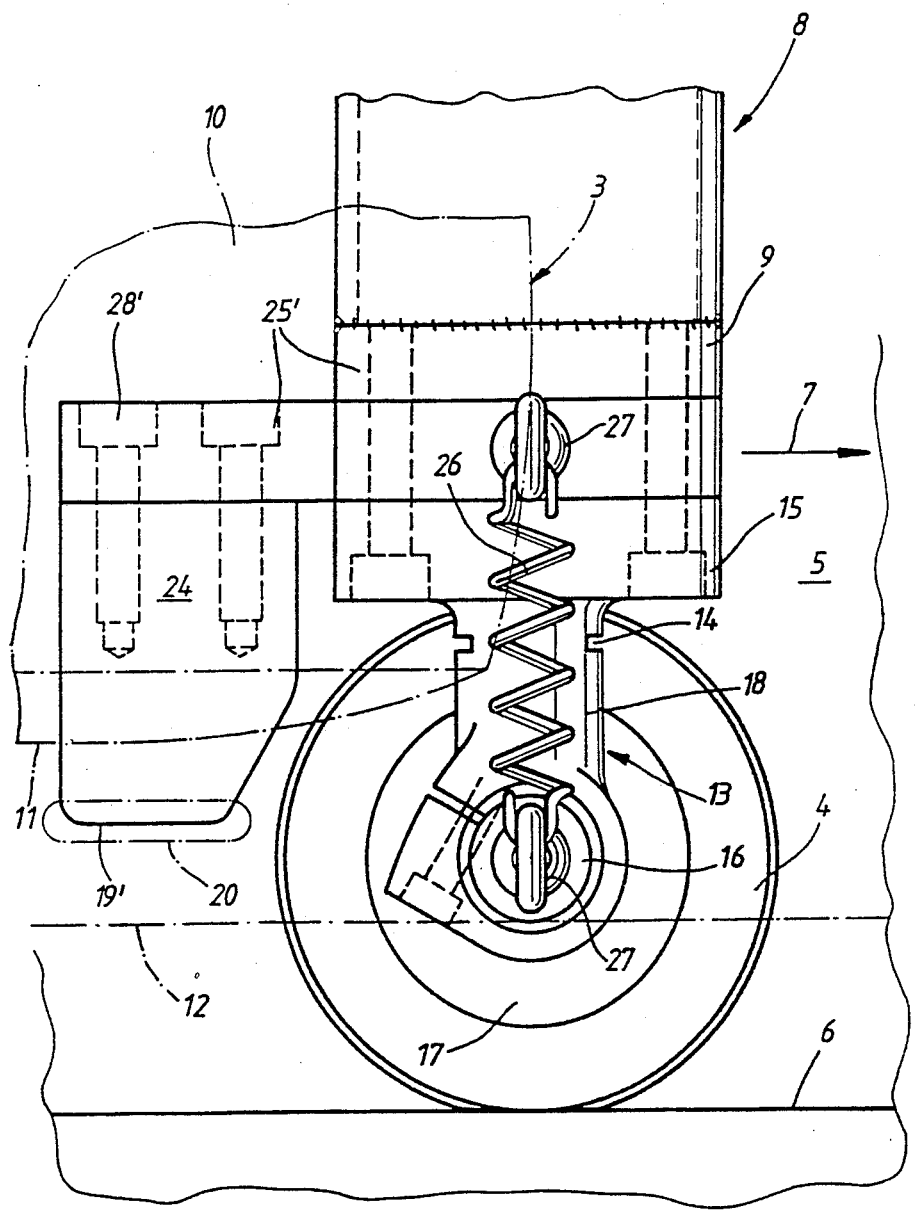
FIG. 5 shows a modified exemplary embodiment having a skid as emergency contact surface in a similar view as FIG. 2.

In its modified construction, illustrated in FIG. 5, the emergency contact surface 19' is formed by a skid 20 which is formed at the end of slide block 24 projecting freely from the intermediate plate 25° and/or the shank 28'. The skid 20 is bevelled at its leading end, relative to the circumferential part of the transverse guide roller 4, not only for reasons of space, but also for reasons of better sliding over irregularities on the side surface of the transverse guide rail 6. The slide block 24, which forms an integral workpiece with the skid 20, consists advantageously of a hardened and therefore wear resistant piece of steel which can easily be renewed if required. It is also contemplated to construct the skid 20 in the form of a soldered-on impact-resistant hard metal bar.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Track-guidable omnibus having a horizontally placed transverse guide roller associated near the ground with each lockable vehicle wheel of a steerable vehicle axle of the omnibus, each roller being mounted in front of the associated lockable wheel, as viewed in the direction of forward travel of the omnibus, by a bracket arm which is fastened at the associated lockable vehicle wheel, so that a circumferential part of the transverse guide roller, which faces an outside of the omnibus, laterally overhangs an external side flank of a wheel tire of the associated vehicle wheel in every lock position of the vehicle wheels, the bracket arm also having a preferred breaking point produced by a weakening of material in the bracket arm near an outer end of the bracket arm which embraces a top side of the transverse guide roller, wherein an emergency contact surface, which, in the case of a breakage of the transverse guide roller, temporarily and provisionally performs as a track guidance means, means for locating the emergency contact surface approximately at a same height as a lower part of the transverse guide roller and is exposed towards the outside of the omnibus, the emergency contact surface being fitted to the bracket arm at a point located nearer the associated vehicle wheel than the preferred breaking point, and set back in a lateral direction relative to an external circumferential part of the associated transverse guide roller so as to laterally overhang the external side flank of the associated wheel tire.

2. Omnibus according to claim 1, wherein the emergency contact surface is fitted to the bracket arm behind the transverse guide roller in the direction of travel.

3. Omnibus according to claim 1, wherein the emergency contact surface is formed by a skid made of wear-resistant material.

4. Omnibus according to claim 3, wherein the skid is retained by a slide block projecting from the bracket arm freely transversely to the wheel plane.

5. Omnibus according to claim 4, wherein the slide block is retained by an intermediate plate which is connected by flanges to a fastening flange of the bracket arm in common with a change part comprising the preferred breaking point.

6. Omnibus according to claim 1, wherein the emergency contact surface is formed by a small emergency roller.

7. Omnibus according to claim 6, wherein the emergency roller is provided with a vibration-damping tire particularly made of one of rubber, plastic and wood.

8. Omnibus according to claim 7, wherein the emergency roller is retained by a bolt projecting from the bracket arm freely transversely to the wheel plane.

9. Omnibus according to claim 8, wherein the bolt is retained by an intermediate plate which is connected by flanges to a fastening flange of the bracket arm in common with a change part comprising the preferred breaking point.

10. Omnibus according to claim 1, wherein a pretensioned erecting spring bridging the preferred breaking point, fastened on either side of the latter and preferably constructed as a helicoidal traction spring, is fastened above the end region of the bracket arm which contains the preferred breaking point.

11. Omnibus according to claim 10, wherein the erecting spring which is constructed as a helicoidal traction spring is hooked by each of hooking eyes attached to its ends into an eyebolt, one of which is engaged in an intermediate plate which is connected by flanges to a fastening flange of the bracket arm in common with a change part comprising the preferred breaking point and an other in a top end face of a journal of the transverse guide roller.

* * * * *